(12) United States Patent
Kozawa

(10) Patent No.: US 7,966,870 B2
(45) Date of Patent: Jun. 28, 2011

(54) AIR FLOW MEASURING DEVICE

(75) Inventor: Masayuki Kozawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 12/466,075

(22) Filed: May 14, 2009

(65) Prior Publication Data

US 2009/0308147 A1  Dec. 17, 2009

(30) Foreign Application Priority Data

Jun. 11, 2008  (JP) .................................. 2008-153367

(51) Int. Cl.
*G01M 15/04* (2006.01)
(52) U.S. Cl. ................ 73/114.32; 73/204.22; 73/204.23
(58) Field of Classification Search ............... 73/114.32, 73/204.22, 204.23
See application file for complete search history.

(56) References Cited

U.S. PATENT DOCUMENTS

| | | | |
|---|---|---|---|
| 6,012,432 A * | 1/2000 | Igarashi et al. ............... 123/494 |
| 6,182,639 B1 | 2/2001 | Igarashi et al. | |
| 6,427,668 B1 | 8/2002 | Igarashi et al. | |
| 7,373,815 B2 * | 5/2008 | Kozawa et al. ............ 73/204.22 |
| 7,469,582 B2 * | 12/2008 | Saito et al. ................. 73/204.22 |
| 2003/0209068 A1 | 11/2003 | Yonezawa | |
| 2004/0011125 A1 * | 1/2004 | Kozawa et al. ............ 73/204.22 |
| 2004/0129073 A1 * | 7/2004 | Saito et al. ................. 73/204.22 |
| 2006/0027016 A1 * | 2/2006 | Kozawa et al. ............. 73/118.2 |
| 2009/0095069 A1 * | 4/2009 | Lang et al. ................. 73/204.22 |

FOREIGN PATENT DOCUMENTS

| | | |
|---|---|---|
| EP | 1 378 728 A2 | 1/2004 |
| EP | 1 391 699 A1 | 2/2004 |
| JP | 4-353721 | 12/1992 |
| JP | 11-14423 A | 1/1999 |
| JP | 11-101676 A | 4/1999 |
| JP | 2000-002569 | 1/2000 |
| WO | WO 2006/019923 A2 | 2/2006 |

OTHER PUBLICATIONS

EP Search Report dated Oct. 16, 2009—6 pages.

* cited by examiner

*Primary Examiner* — Freddie Kirkland, III
(74) *Attorney, Agent, or Firm* — Crowell & Moring LLP

(57) ABSTRACT

An air flow measuring device includes a body with a main air passage and a sensor attached to the body for detecting a flow rate of air passing through the main air passage. A positioning part that positions the body and the sensor is configured to be exposed to the outside.

10 Claims, 12 Drawing Sheets

AIR FLOW MEASURING DEVICE

BACKGROUND OF THE INVENTION

1. Field of the Invention

The present invention relates to air flow measuring devices and more particularly to an air flow measuring device for measuring a flow rate of air, for example, sucked into an internal combustion engine.

2. Description of the Related Art

For example, a heating resistor type air flow measuring device is known as an air flow measuring device for measuring the flow rate of air sucked into an internal combustion engine. The air flow measuring device includes a body with a main air passage, and a measuring unit assembled to the body as disclosed in JP-A No. 14423/1999.

The measuring unit includes a flow rate detection element for measuring the flow rate of air flowing through the main air passage, an electronic circuit electrically connected to the flow rate detection element, and a housing for accommodating the flow rate detection element and the electronic circuit, the housing being fixed to the body with its tip inserted into an insertion hole of the body.

The flow rate detection element of the measuring unit is disposed in a sub-air passage into which part of air in the main air passage formed at the tip of the housing flows. Variations in positional relation between the main air passage and the sub-air passage change the distribution of flow velocity in the sub-air passage, leading to change in flow of air near the flow rate detection element, resulting in errors of measurement accuracy of the air flow measuring device.

Thus, in order to increase the accuracy of measurement of the air flow measuring device, it is important to suppress variations in assembly position of the measuring unit. Particularly, in such an air flow measuring device, variations in assembly position have great influence on measurement errors of the air flow rate as compared to any other intake air temperature sensor or pressure sensor assembled to an intake pipe of the internal combustion engine. Thus, it is very important to ensure the appropriate accuracy of the assembly position.

For example, JP-A No. 101676/1999 discloses a method for positioning a protrusion formed in a measuring unit by fitting the protrusion into a recess of a body, as a method for decreasing variations in assembly position in assembling the measuring unit to the body.

SUMMARY OF THE INVENTION

However, since in the technique disclosed in JP-A No. 101676/1999, the protrusion is formed in the measuring unit, and the recess into which the protrusion is fitted is formed in the body, the assembly of the measuring unit to the body causes the recess and protrusion to be hid between the measuring unit and the body, which makes it impossible to observe the state of fitting from the outside. Thus, the measuring unit cannot be assembled to the body while visually confirming the state of fitting, which leads to degradation of workability.

As mentioned above, in order to improve the measurement accuracy of the air flow measuring device, it is important to suppress variations in assembly position of the measuring unit. Suppression of the variations needs to reduce a clearance between the recess and protrusion as much as possible, thereby reducing a rattling state of the device. However, when the clearance is made small, the protrusion may not be normally fitted into the recess in assembling, which may lead to degradation of measurement accuracy of the air flow measuring device.

Accordingly, it is an object of the present invention to provide an air flow measuring device with excellent assembly workability which improves the measuring accuracy by suppressing variations in assembly position.

In order to achieve the forgoing object, an air flow measuring device according to an embodiment of the invention includes a positioning part that positions a body and a sensor. The positioning part is exposed to the outside.

According to the invention, the positioning part can be visually confirmed from the outside. Thus, the air flow measuring device can suppress variations in assembly position to improve the measurement accuracy, and further improve the assembly workability of the body and the sensor.

DETAILED DESCRIPTION OF THE PREFERRED EMBODIMENTS

Preferred embodiments of the invention will be described below with reference to the accompanying drawings.

Figure 1:
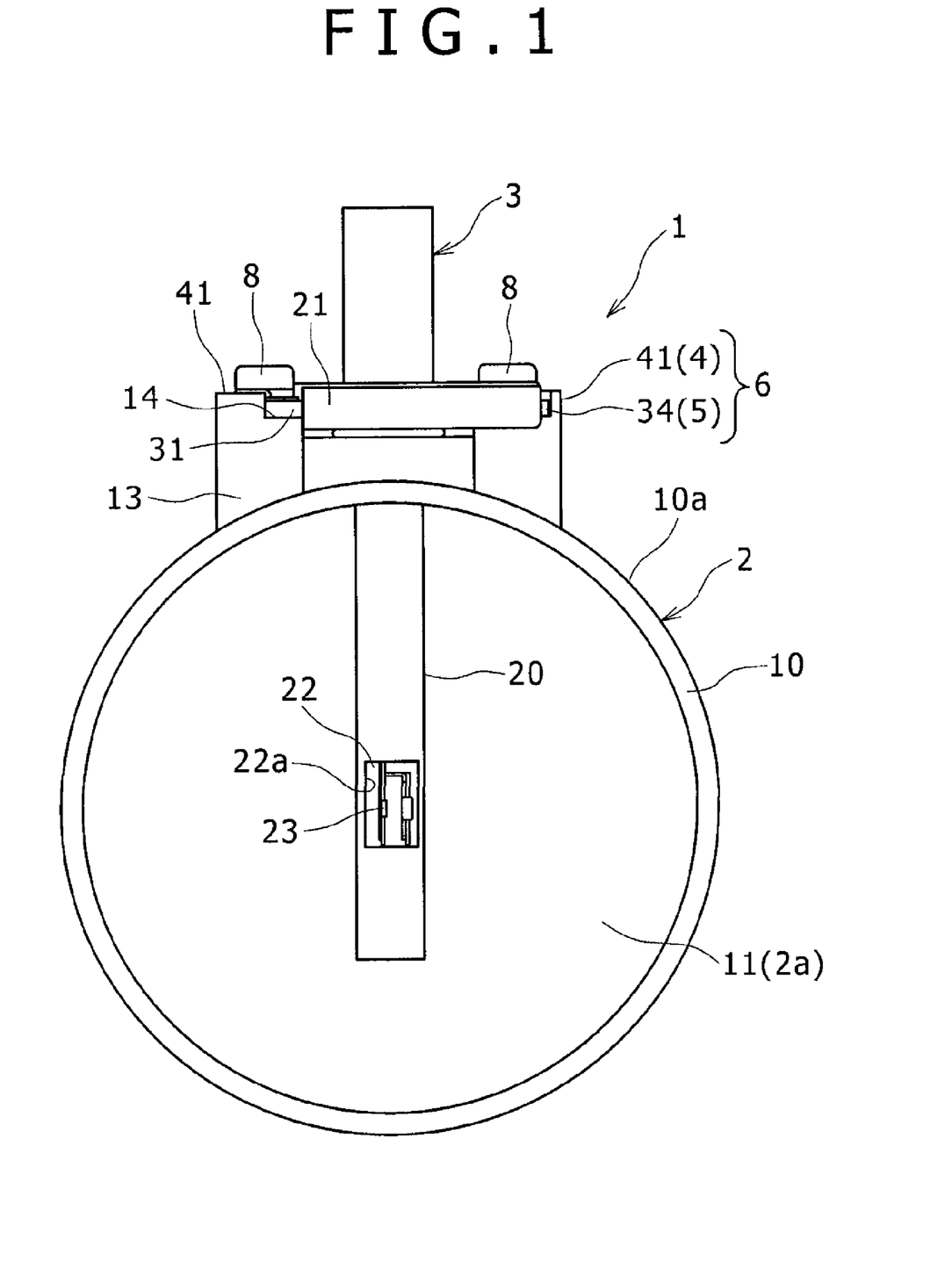
FIG. 1 is a front view of an air flow measuring device according to a first embodiment of the invention.
Figure 2:
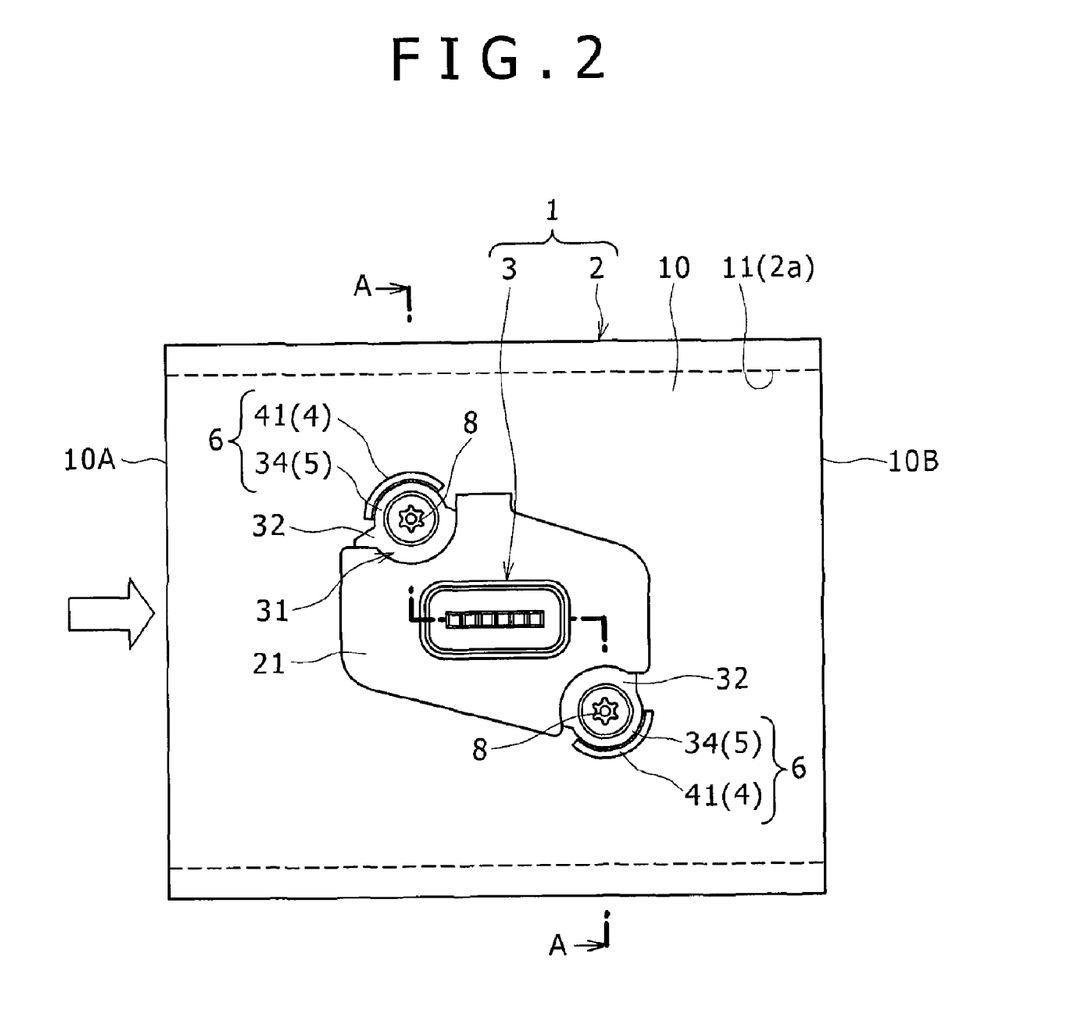
FIG. 2 is a plan view of the air flow measuring device of the first embodiment.
Figure 3:
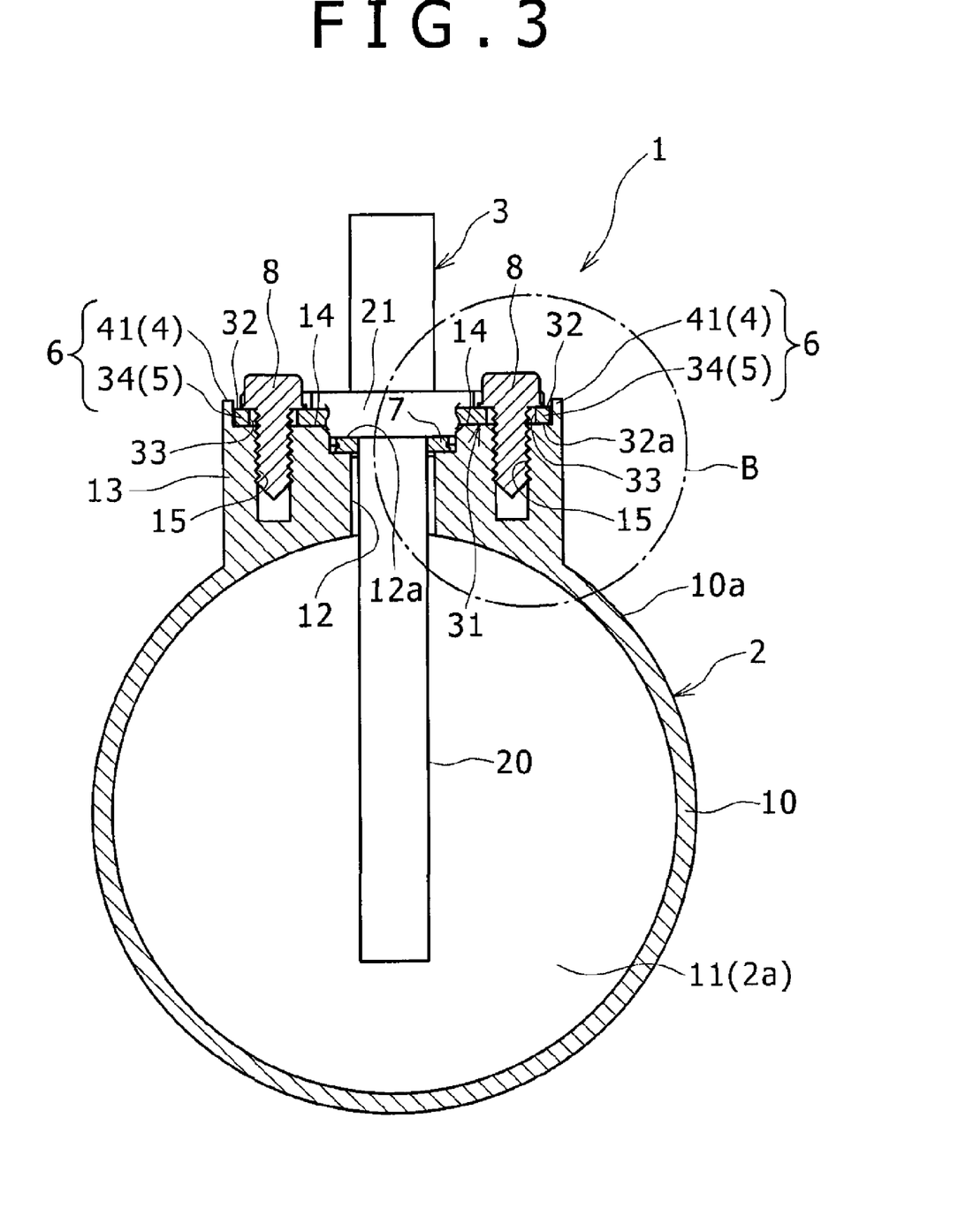
FIG. 3 is a sectional view taken along the line A-A of FIG. 2.
Figure 4:
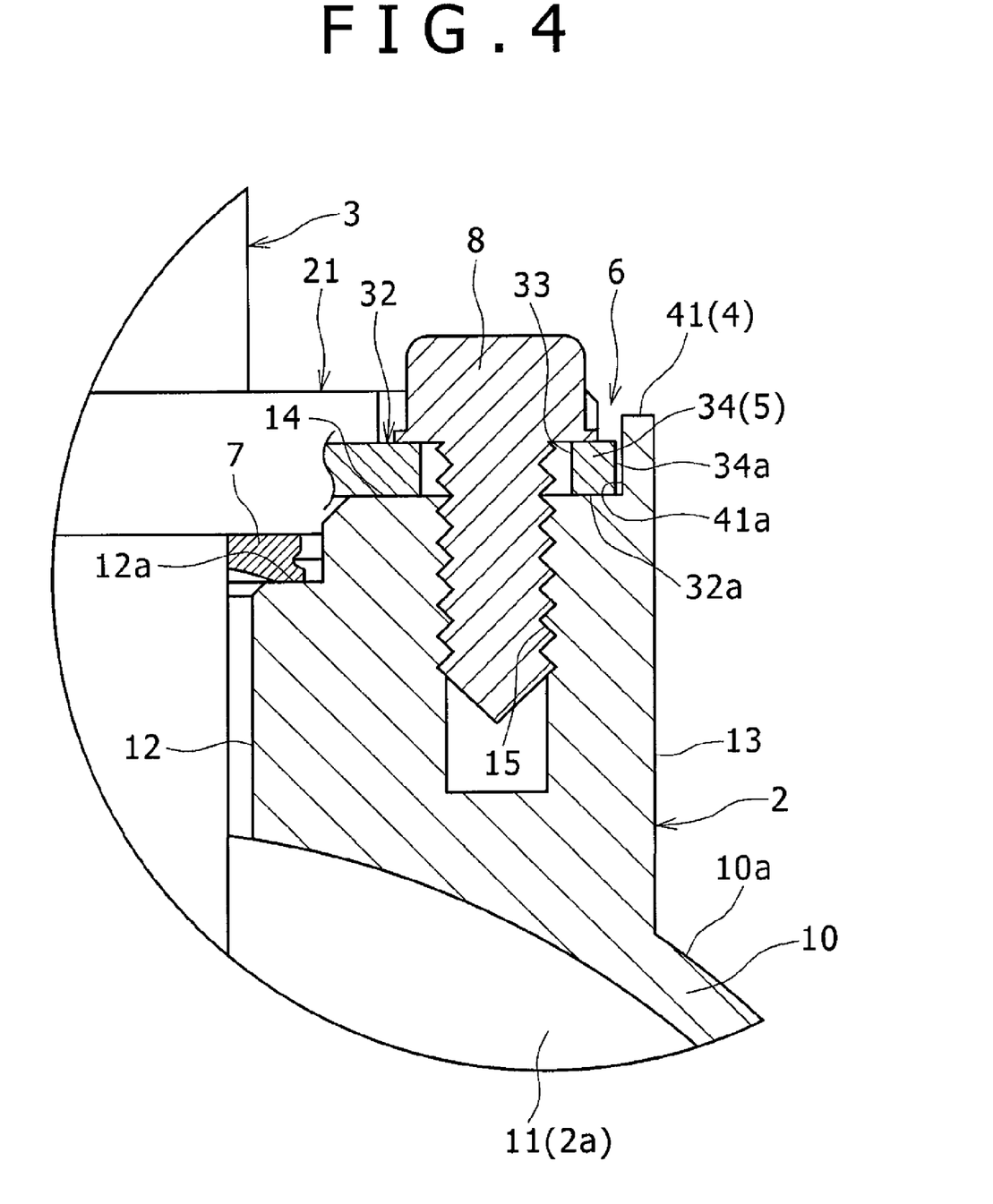
FIG. 4 is an enlarged view of a B portion shown in FIG. 3.

FIG. 1 is a front view of an air flow measuring device 1 according to a first embodiment of the invention. FIG. 2 is a plan view thereof. FIG. 3 is a sectional view taken along the line A-A of FIG. 2. FIG. 4 is an enlarged view of a B portion shown in FIG. 3.

The air flow measuring device 1 of the present embodiment is used for a fuel injection control system 100 (see FIG. 14) of an internal combustion engine, and intervenes in a midway point of an intake passage between an air cleaner 101 and an intake duct 102 to measure the flow rate of air sucked by an engine cylinder 106.

As shown in FIG. 1, the air flow measuring device 1 includes a body 2 with a main air passage 2a, and a sensor 3 attached to the body 2 for detecting the flow rate of sucked air passing through the main air passage 2a.

As shown in FIG. 2, the body 2 and the sensor 3 are provided with a body fitting portion 4 and a sensor fitting portion 5, respectively, which are fitted with each other in attaching the sensor 3 to the body 2. The body fitting portion 4 and the sensor fitting portion 5 have the respective structures whose fitting state is exposed to the outside, and thus can be visually confirmed. A positioning part 6 is provided for relatively positioning the body 2 and the sensor 3 in the fitting state.

The body 2 of the air flow measuring device 1 has a cylindrical main body 10, in which a center hole 11 forms the main air passage 2a. As shown in FIG. 2, the main body 10 has an upstream portion 10A connected to the air cleaner 101 (see FIG. 14), and a downstream portion 10B connected to the intake duct 102 (see FIG. 14).

As shown in FIG. 3, the main body 10 includes an insertion hole 12 into which a housing 20 of the sensor 3 is inserted, and an attachment portion 13 to which a fixed flange 21 of the sensor 3 is fixed. The insertion hole 12 is formed in the main body 10 along the radial direction of the main body 10. An opening 12a of the insertion hole 12 is located in a position in height under an attachment surface 14 of the attachment portion 13, and has its diameter enlarged via a step. A gasket 7 intervenes in between the main body 2 and the sensor 3. The gasket 7 is held between the sensor 3 and the body 2 to keep air tightness between both.

The attachment portion 13 is formed to protrude from an outer peripheral surface 10a of the main body 10 radially outward in the axial direction of the insertion hole 12. The protruding end of the attachment portion 13 has the attachment surface 14 extending in the direction orthogonal to the axial direction of the insertion hole 12. The attachment surface 14 is provided with screw holes 15 formed in positions opposed to each other via the insertion hole 12.

The attachment portion 13 is provided with protrusions 41 each forming the body fitting portion 4 of the positioning part 6. The protrusions 41 are provided in pairs in the positions opposed to each other via the attachment surface 14 as shown in FIG. 3. Each protrusion 41 protrudes to a position in height above the attachment surface 14. The protrusion 41 has an arc shape whose center is located in a coaxial position with respect to the center of the screw hole 15 as shown in FIG. 2.

On the other hand, the sensor 3 of the air flow measuring device 1 has a housing 20 made of resin and having a metal base plate 31 embedded and held in and by the fixed flange 21 as shown in FIG. 1. The housing 20 radially extends in the center hole 11 by being inserted into the insertion hole 12 (see FIG. 3) of the body 2, and has a flat three-dimensional shape along the flow of air passing through the main air passage 2a. The housing 20 is provided with a sub-air passage 22 through which part of the air flowing through the main air passage 2a flows.

In the sub-air passage 22, an inlet opening surface 22a is opened toward the upstream side substantially at the center of the center hole 11 so as to be directed vertically with respect to the air flow. The air flowing from the inlet opening surface 22a into the sub-air passage 22 flows from an outlet opening surface (not shown) formed to be opened at the side of the housing 21. A flow rate detection element 23 is disposed in the midway position of the sub-air passage 22.

As shown in FIGS. 1 and 2, the fixed flange 21 has a substantially rectangular plate shape at the base end of the housing 20 extending in a plane in the direction orthogonal to the direction of extension of the housing 20. Base corners (exposed portions) 32 of the base plate 31 are exposed at a pair of corners positioned diagonally.

Referring to FIGS. 3 and 4, each base corner 32 has an attachment hole 33 formed therein. Fixation screws 8 are inserted into the pair of attachment holes 33 and screwed into the screw holes 15 of the attachment portion 13, so that the fixed flange 21 can be fixed to the attachment portion 13. When the fixed flange 21 is fixed to the attachment portion 13, a lower surface 32a of the base corner 32 is in contact with the attachment surface 14 of the attachment portion thereby to suppress variations in assembly position in the insertion direction.

Further, the base corner 32 has an end edge 34 formed therein for forming the sensor fitting portion 5 of the positioning part 6. The end edge 34 as shown in FIG. 2 has an arc shape whose center is located in the coaxial position with respect to the center of the attachment hole 33. When the sensor 3 is attached to the body 2, an outer wall surface 34a of the end edge 34 is opposed to the inner wall surface 41a of the protrusion 41 to be abutted against or spaced apart from the inner wall surface 41a by a predetermined distance.

Thus, the positioning of the sensor 3 in the direction orthogonal to the insertion direction with respect to the body 2 can be performed by attaching the sensor 3 to the body 2, and fitting the body fitting portion 4 of the positioning part 6 into the sensor fitting portion 5, which can suppress the variations in attachment position in the plane direction along the attachment surface 14 including the rotation direction.

The assembly of the air flow measuring device 1 involves first inserting the housing 20 of the sensor 3 into the insertion hole 12 of the body 2. The lower surface 32a of the base corner 32 is brought into contact with the attachment surface 14 of the attachment portion 13, and the outer wall surface 34a of the end edge 34 is opposed to the inner wall surface 41a of the protrusion 41 to be abutted against or spaced apart from the inner wall surface 41a by the predetermined distance. The fixation screws 8 are inserted into the attachment holes 33 to be screwed into the screw holes 15, thereby allowing the sensor 3 to be fixed to the body 2, whereby the air flow measuring device 1 is assembled.

With the above-mentioned arrangement, the positioning part 6 is exposed to the outside, and thus can be virtually confirmed from the outside. Thus, the air flow measuring device can suppress variations in assembly position of the sensor 3 with respect to the body 2 to improve the measurement accuracy, and further improve the workability of assembly of the body 2 and the sensor 3.

In particular, the positioning of the sensor 3 in the insertion direction with respect to the body 2 is performed by bringing the attachment surface 14 of the attachment portion 13 into contact with the lower surface 32a of the base corner 32, thereby suppressing the variations in attachment position in the insertion direction.

Positioning of the sensor 3 in the direction orthogonal to the insertion direction with respect to the body 2 is performed by causing the outer wall surface 34a of the end edge 34 of the base plate 31 to be opposed to the inner wall surface 41a of the protrusion 41, and then to be abutted against or spaced apart from the inner wall surface 41a by the predetermined distance. Thus, the movement of the sensor 3 in the plane direction along the attachment surface 14 of the attachment portion 13 can be restricted, which can suppress the variations in assembly position along the attachment surface 14 including the rotation direction.

In viewing the attachment portion 13 of the body 2 in the insertion direction of the sensor 3, the protrusions 41 are provided outside a projected area of the fixed flange 21. When the sensor 3 is attached to the body 2, the fitting state of the body fitting portion 4 and the sensor fitting portion 5 can be virtually confirmed in the insertion direction of the sensor 3, so that the sensor 3 can be fixed to the body 2 while virtually confirming the fitting state.

Before fixing the sensor 3 by the fixation screws 8, the fitting state of the body fitting portion 4 and the sensor fitting portion 5 can be virtually confirmed easily. Thus, after the confirmation, the fixing work can be performed, which can prevent degradation of measurement accuracy of the air flow rate due to variations in assembly position of the sensor 3.

The positioning part 6 is formed near the screw hole 15 of the body 2 and the attachment hole 33 of the sensor 3, so that the positioning state can be virtually confirmed without moving an operator's eye point during the fixing work for fixing the sensor 3 to the body 2 by the fixation screws 8. That is, both of the confirmation of the positioned state and the fixing work can be performed while the eye point is as it is.

Also, after the body 2 and the sensor 3 are fixed together by the fixation screws 8, which is the last form of the air flow measuring device 1, the positioning part 6 can be virtually confirmed, which can easily confirm the positioning. Thus, the assembly workability of the measuring device can be improved.

Further, the fixing work can be performed while the fixing is confirmed without moving the operator's eye point. Thus, the fixing work can automatically be performed at low cost.

The positioning accuracy of the sensor 3 with respect to the body 2 is set strictly high, and a clearance between the inner wall surface 41a of the protrusion 41 and the outer wall surface 34a of the end edge 34 is made as small as possible, or almost nothing, which can improve the measurement accuracy of the air flow measuring device 1.

In this embodiment, the fitting state of the body fitting portion 4 and the sensor fitting portion 5 is virtually confirmed with ease even in the small clearance between the inner wall surface 41a of the protrusion 41 and the outer wall surface 34a of the end edge 34, which can improve the measurement accuracy of the air flow measuring device 1 without degradation of the assembly workability.

The protrusion 41 of the body 2 has a greater height than that of the attachment surface 14 of the sensor 3, and thus can guide the sensor 3 in attaching to the body 2, which can improve the assembly workability.

For example, the inner wall surface 41a of the protrusion 41 has a tapered shape inclined so as to be made closer to the center of the screw hole 15 from the upper end of the protrusion 41 to the lower end thereof. In an initial stage of insertion where a spaced distance between the attachment surface 14 of the attachment portion 13 and the lower surface 32a of the base corner 32 becomes large, the clearance between the inner wall surface 41a and the outer wall surface 34a is large. In contrast, in a later stage of insertion directly before when the spaced distance between the attachment surface 14 and the lower surface 32a becomes small to allow surface contact therebetween, the clearance is small, or almost nothing.

Thus, the sensor 3 can be easily inserted into the body 2, and can be positioned in attachment. That is, even when the clearance is made as small as possible, or almost nothing, the air flow measuring device 1 can improve the measurement accuracy without degradation of the assembly workability.

In the air flow measuring device 1 with the above-mentioned arrangement, the base plate 31 is made of metal material, which can decrease a process tolerance of the sensor fitting portion having the arc shape. Thus, the clearance between the inner wall surface 41a of the protrusion 41 and the outer wall surface 34a of the end edge 34 in attachment can be made as small as possible, which can improve the measurement accuracy of the air flow measuring device 1. The above arrangement of this embodiment can improve the measurement accuracy of the measuring device 1 at low cost.

Although the gasket 7 of this embodiment in use is a sealing structure for sealing a gap between an upper surface and a lower surface by being held therebetween in the axial direction, the gasket 7 may be any other sealing structure for sealing a gap between sides by a pressing force in a radial direction, such as an O ring, to have the same operation and effect. The fixation screw 8 in use is a tapping screw, but is not limited thereto. Any other screw can have the same operation and effect in use.

The shape of the main body 10 in use is cylindrical, but is not limited thereto. Alternatively, a main body 10 having an elliptic cylindrical shape may have the same operation and effect. Although the air cleaner 101 and the main body 10 are separated components in use, the air flow measuring device is not limited thereto. An air flow measuring device 1 including an air cleaner 101 and a main body 10 which are integrated together may be used. The air flow measuring device 1 includes the air cleaner 101 having the body 2 with the main air passage 2a, and the sensor 3 attached to the body 2 for detecting the flow rate of air sucked through the main air passage 2a. Such an air flow measuring device 1 also has the same operation and effect.

Figure 5:
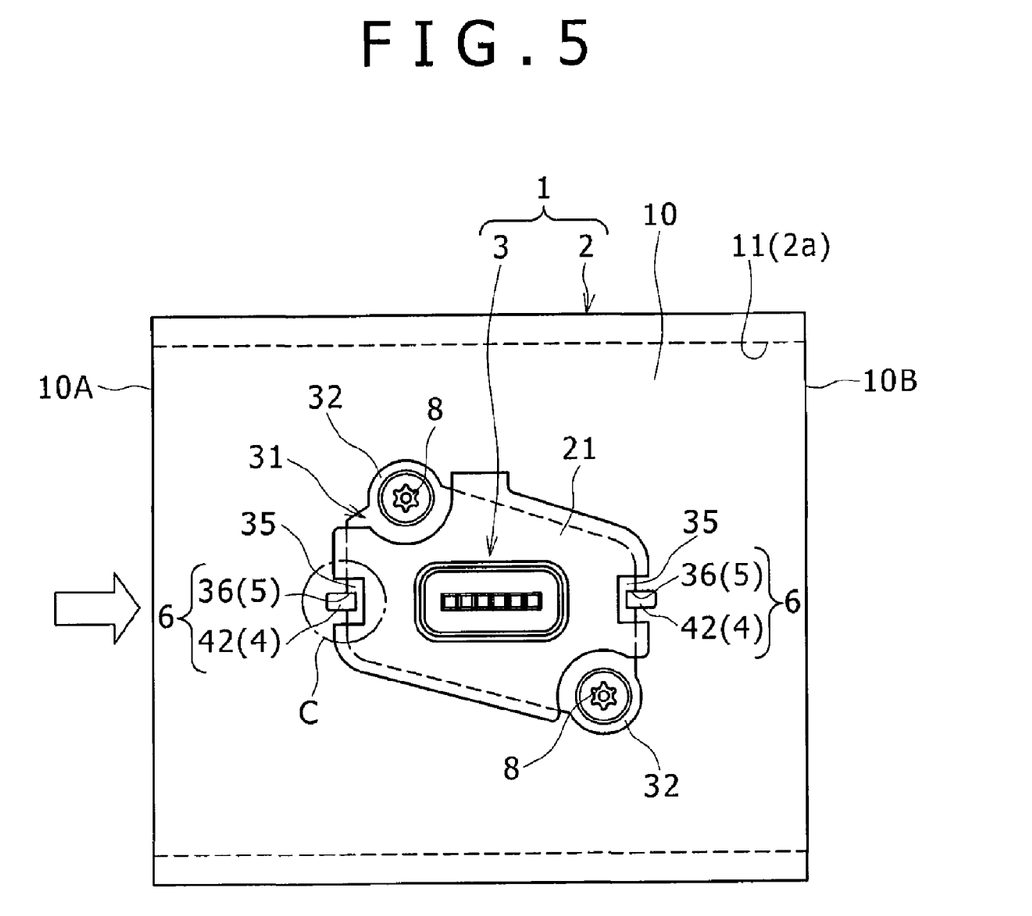
FIG. 5 is a plan view of an air flow measuring device according to a second embodiment of the invention.
Figure 6:
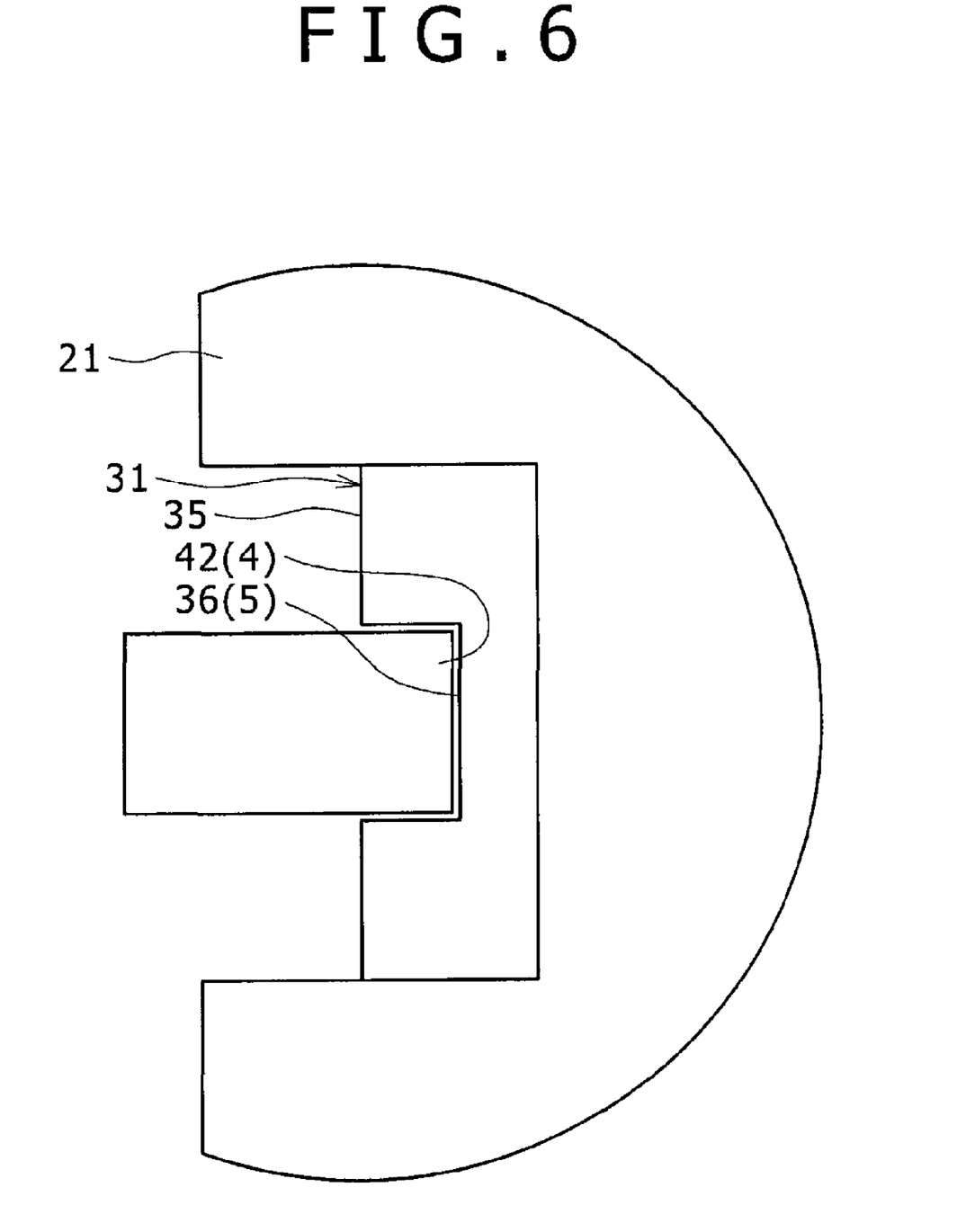
FIG. 6 is an enlarged view of a C portion shown in FIG. 5.

Now, a second embodiment of the invention will be described below using FIGS. 5 and 6. FIG. 5 is a plan view of the air flow measuring device 1 of the second embodiment, and FIG. 6 is an enlarged view of a C portion shown in FIG. 5. The same or like components as those of the first embodiment will be designated by the same reference characters, and a detailed description thereof will be omitted below.

This embodiment has the feature that exposed portions 35 of a base plate 31 exposed from the fixed flange 21 are provided separately from base corners 32, and that the exposed portions 35 are provided with cutout portions 36 forming the sensor fitting portions 5 of the positioning part 6, while the protrusions 42 to be fitted into the cutout portions 36 are provided in the body 2. Each protrusion 42 forms the body fitting portion 4 of the positioning part 6.

As shown in FIG. 5, the protrusions 42 are provided in pairs in positions spaced apart on the upstream side and the downstream side of the body 2 via the insertion hole 12 (see FIG. 3), and protrude to a position higher than the attachment surface 14 of the attachment portion 13 (see FIG. 1). As shown in FIGS. 5 and 6, the protrusion 42 is formed in a quadrangular prism shape having a substantially rectangular planar shape.

On the other hand, the exposed portions 35 are provided in positions spaced apart in the longitudinal direction via the housing 20 (see FIG. 1), and the cutout portion 36 is formed to be cut at a certain width in each exposed portion 35.

The positioning of the sensor 3 in the direction orthogonal to the insertion direction with respect to the body 2 is performed by fitting the protrusion 42 of the body 2 into the cutout portion 36 in attaching the sensor 3 to the body 2, which suppresses the variations in attachment position in the plane direction along the attachment surface 14, including the rotation direction of the sensor 3 with respect to the body 2.

With the above-mentioned arrangement, the positioning part 6 is exposed to the outside, and thus can be virtually confirmed from the outside. Thus, the variations in assembly position of the sensor 3 with respect to the body 2 can be suppressed, which improves the measurement accuracy. Further, the assembly workability of the sensor 3 to the body 2 can be improved.

The protrusions 42 of the body 2 are positioned outside the projected area of the fixed flange 21 in viewing the body 2 in the direction of attaching the sensor 3 to the body 2, so that the sensor 3 can be attached to the body 2 while virtually confirming the fitting state of the protrusions 42 and the cutout portions 36. Thus, the second embodiment can obtain the same operation and effect as those of the first embodiment.

In the description of this embodiment, the protrusion 42 and the cutout portion 36 have the rectangular shape, but are not limited thereto. The protrusion 42 and the cutout portion 36 can have various shapes as applications, such as a circular shape, an arc shape, a triangle shape, and the like to obtain the same operation and effect.

With this arrangement, even when the clearance between the cutout portion 36 of the sensor 3 and the protrusion 42 of the body 2 is made as small as possible, or almost nothing, the virtual confirmation of the fitting state can be easily performed in positioning the sensor 3 in the direction orthogonal to the insertion direction with respect to the body 2. This embodiment has the same operation and effect as those of the first embodiment.

In this embodiment, the exposed portions 35 can be provided in arbitrary positions along the end edge of the base plate 31, and the cutout portions 36 can also be provided. Thus, the positioning part 6 can be arranged in any position designed taking into consideration other parts due to design limitations or assembly limitations of the parts except for the air flow measuring device 1, for example, an engine layout, which can improve usability and workability.

Figure 7:
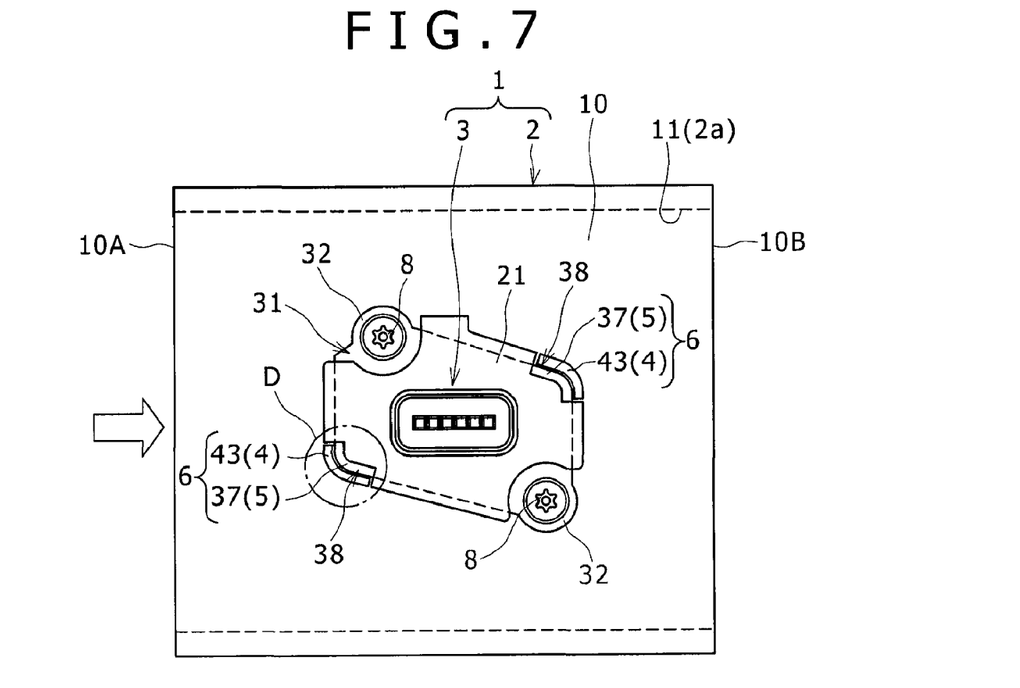
FIG. 7 is a plan view of an air flow measuring device according to a third embodiment of the invention.
Figure 8:
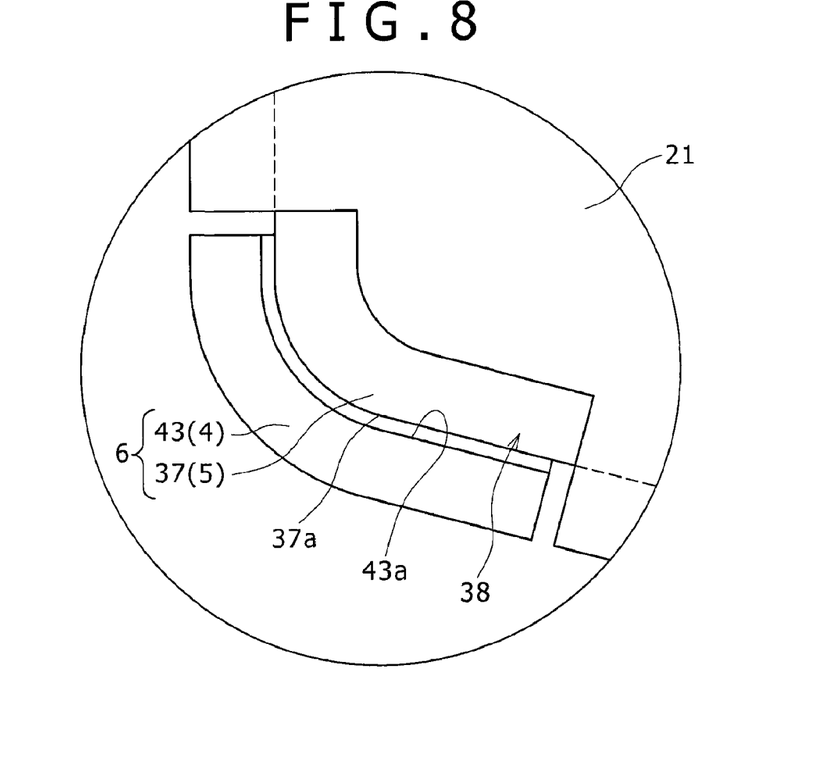
FIG. 8 is an enlarged view of a D portion shown in FIG. 7.

Now, a third embodiment of the invention will be described below using FIGS. 7 and 8. FIG. 7 is a plan view of the air flow measuring device 1 in the third embodiment, and FIG. 8 is an enlarged view of a D portion shown in FIG. 7.

This embodiment has the feature that a pair of base corners 38 is provided separately from the base corners 32 with attachment holes 33, and a protrusion 43 of the body 2 is fitted into an end edge 37 of each base corner 38.

As shown in FIG. 7, the protrusions 43 of the body 2 are provided in pairs in positions spaced apart on the upstream and downstream sides of the body 2 via the insertion hole 12 (see FIG. 3), and protrude to a position higher than the attachment surface 14 of the attachment portion 13 (see FIG. 1). As shown in FIG. 8, the protrusion 43 has a shape curved substantially in an L-like shape along the shape of the base corner 38 to serve as the body fitting portion 4 of the positioning part 6.

On the other hand, the end edge 37 serving as the sensor fitting portion 5 of the positioning part 6 is formed at the base corner 38 of the sensor 3. The end edge 37 is formed such that an outer wall surface 37a of the end edge 37 is opposed to an inner wall surface 43a of the protrusion 43 to be abutted against or spaced apart from the inner wall surface 43a by a predetermined distance in attaching the sensor 3 to the body 2.

With the above-mentioned arrangement, the positioning part 6 is exposed to the outside, and thus can be virtually confirmed from the outside. Thus, the air flow measuring device can suppress variations in assembly position of the sensor 3 with respect to the body 2 to prevent the degradation of measurement accuracy. Further, the workability of assembly of the body 2 and the sensor 3 can be improved.

With the above-mentioned arrangement, the base corner 32 disposed on one diagonal line of the fixed flange 21 can be fixed by the fixation screw 8, and the base corner 38 disposed on the other diagonal line can be positioned by the protrusion 43. Thus, the fixed flange 21 can be multiply-supported at equal intervals along the outer periphery thereof, which accurately enables positioning of the sensor 3 in the direction orthogonal to the insertion direction of the sensor 3 with respect to the body 2, thereby suppressing variations in attachment position in the plane direction along the attachment surface 14 including the rotation direction.

The positioning part 6 are provided in respective positions on a diagonal line that is different from the diagonal line where the fixation screws 8 are attached, so that the fixing state can be constantly confirmed virtually without being interrupted by tools or the like during working for screwing the fixation screw 8.

The protrusions 43 of the body 2 are positioned outside the projected area of the fixed flange 21 in viewing the body 2 in the direction of attaching the sensor 3 to the body 2, so that the attachment can be performed while virtually confirming the fitting state. Thus, this embodiment can obtain the same operation and effect as those of the first embodiment.

With this arrangement, even when the clearance between the inner wall surface 43a of the protrusion 43 and the outer wall surface 37a of the end edge 37 is made as small as possible, or almost nothing, the fitting state can be virtually confirmed easily in positioning of the sensor 3 in the direction orthogonal to the insertion direction with respect to the body 2, which can provide the same operation and effect as those of the first embodiment.

Figure 9:
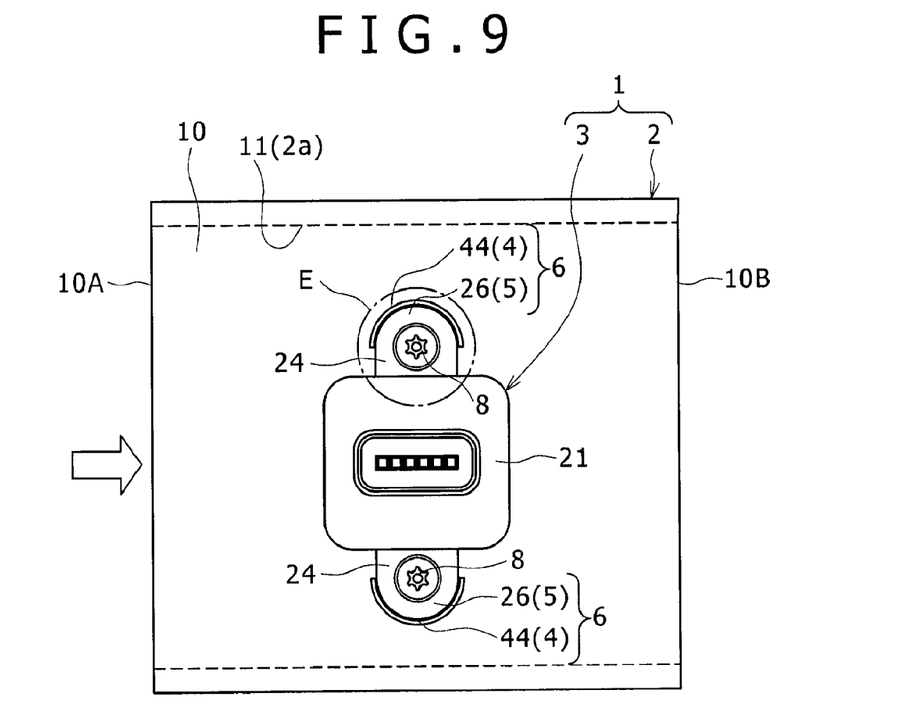
FIG. 9 is a plan view of an air flow measuring device according to a fourth embodiment of the invention.
Figure 10:
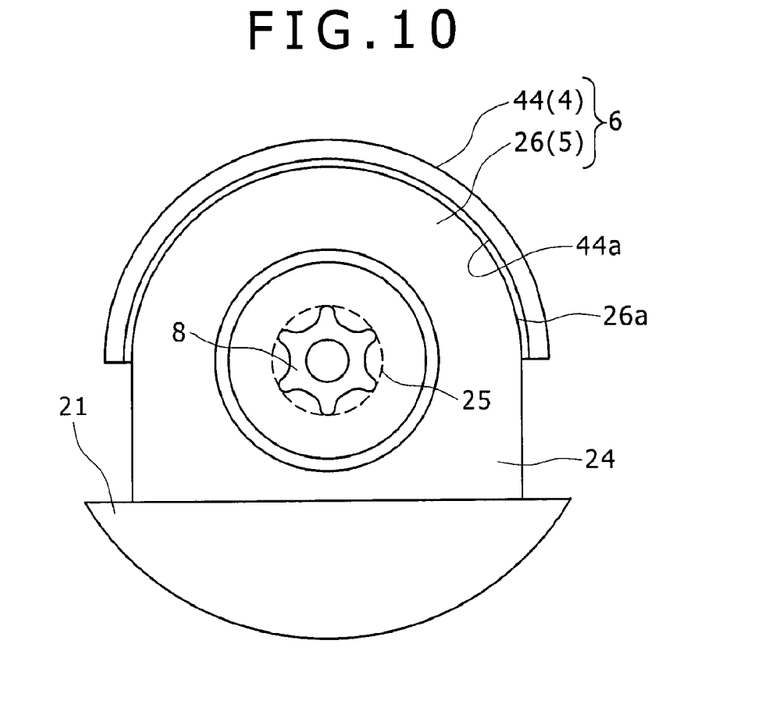
FIG. 10 is an enlarged view of an E portion shown in FIG. 9.

Now, a fourth embodiment of the invention will be described below using FIGS. 9 and 10. FIG. 9 is a plan view of an air flow measuring device in the fourth embodiment, and FIG. 10 is an enlarged view of an E portion shown in FIG. 9.

This embodiment has the feature that fixed tongue pieces 24 made of resin are provided in the fixed flange 21, and an attachment hole 25 is formed in each fixed tongue piece 24. An end edge 26 of the fixed tongue piece 24 is fitted to a protrusion 44 of the body 3.

As shown in FIG. 9, the protrusions 44 of the body 2 are provided in pairs in the direction orthogonal to the axial direction of the body 2 via the insertion hole 12 (see FIG. 3), and protrude to a position higher than the attachment surface 14 (see FIG. 1) of the attachment portion 13. Each protrusion 44 forms the sensor fitting portion 5 of the positioning part 6. The protrusions 44 each have a semicircular shape to be opposed to each other such that the respective centers thereof are spaced apart long from each other as compared to both respective ends thereof.

On the other hand, the fixed tongue pieces 24 are provided so as to protrude in the directions spaced apart from the respective opposed sides of the fixed flange 21. The pair of fixed tongue pieces 24 are made of resin, and integrally formed with the fixed flange 21. As shown in FIG. 10, the attachment hole 25 into which the fixation screw 8 is inserted is formed in the fixed tongue piece 24.

The end edge 26 of the fixed tongue piece 24 has a semicircular shape whose center is located in a coaxial position with respect to the center of the attachment hole 25. When the sensor 3 is attached to the body 2, an outer wall surface 26a of the end edge 26 is opposed to an inner wall surface 44a of the protrusion 44 to be abutted against the inner wall surface 44a, or to have a predetermined distance from the inner wall surface 44a.

With the above-mentioned arrangement, the positioning part 6 is exposed to the outside, and thus can be virtually confirmed from the outside. Thus, the air flow measuring device can suppress variations in attachment position of the sensor 3 with respect to the body 2 to improve the measurement accuracy, and further improve the workability of assembly of the body 2 and the sensor 3.

The above-mentioned arrangement can decrease the number of insert parts in injection molding of a module 4 thereby to improve the workability in molding with resin, leading to reduction in manufacturing cost due to decrease in cost for material.

The positioning of the sensor 3 in the direction orthogonal to the insertion direction with respect to the body 2 can be performed by attaching the sensor 3 to the body 2, and fitting the sensor fitting portion 5 into the body fitting portion 4 of the positioning mean 6, which can suppress the variations in attachment position in the direction along the attachment surface, including the rotation direction.

The protrusions 44 of the body 2 are positioned outside the projected area of the fixed flange 21 in viewing the body 2 in the direction of attaching the sensor 3 to the body 2, so that the sensor 3 can be attached to the body 2 while virtually confirming the fitting state. Thus, this embodiment can obtain the same operation and effect as those of the first embodiment.

With this arrangement, even when a clearance between the inner wall surface 44a of the protrusion 44 and the outer wall surface 26a of the end edge 26 is made as small as possible or almost nothing, the fitting state can be virtually confirmed with ease in positioning of the sensor 3 in the direction orthogonal to the insertion direction with respect to the body 2, which can obtain the same operation and effect as those of the first embodiment.

Figure 11:
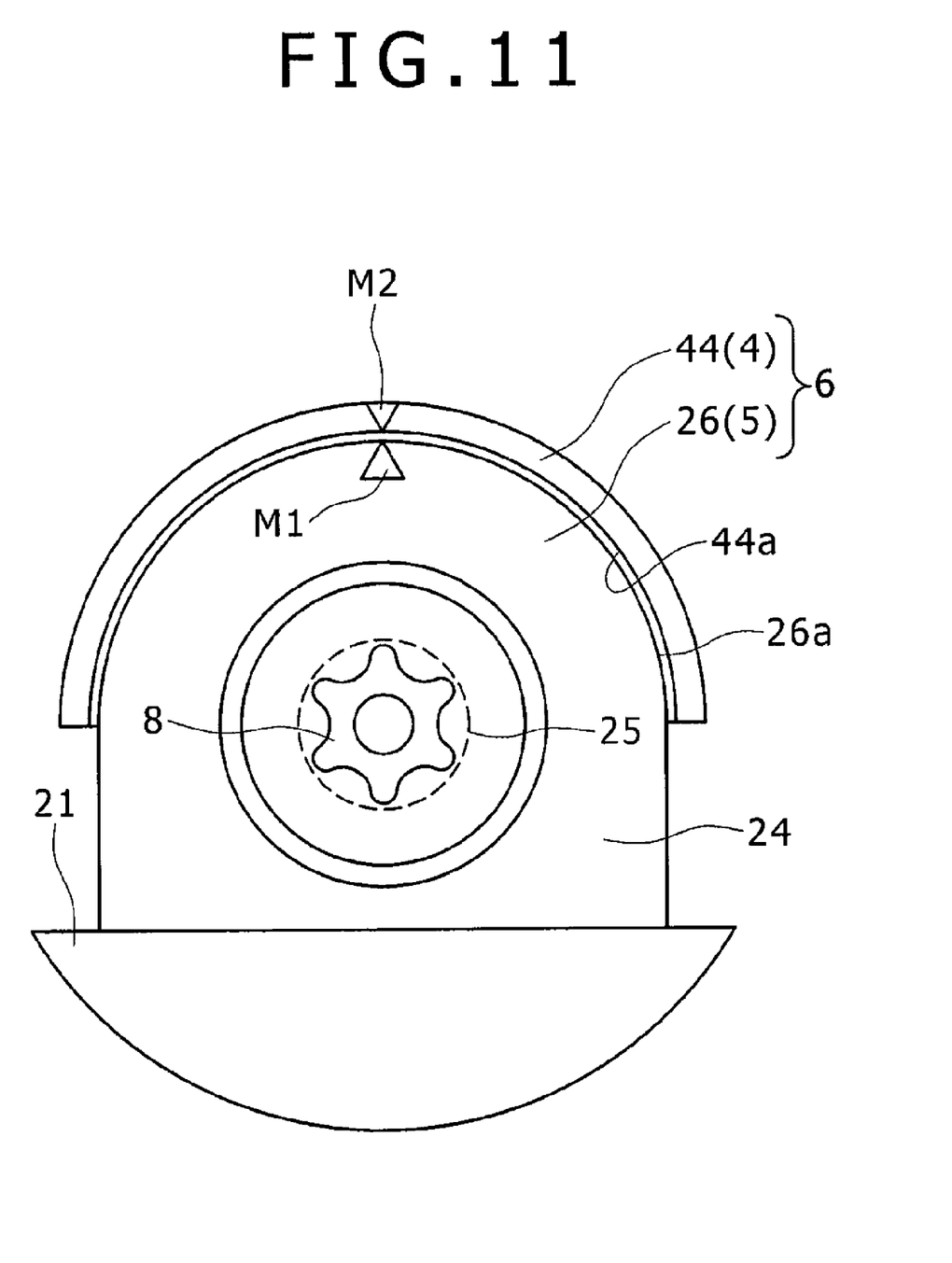
FIG. 11 is a partial enlarged view of an air flow measuring device according to a fifth embodiment of the invention.

Now, a fifth embodiment of the invention will be described below using FIG. 11. FIG. 11 is an enlarged view showing a main portion of an air flow measuring device 1 according to the fifth embodiment. FIG. 11 corresponds to FIG. 10.

This embodiment has the feature that marks M1 and M2 for positioning of the body 2 and the sensor 3 are provided at the end edge 26 of the sensor 3 and the protrusion 44 of the body 2 in the fourth embodiment, respectively. The marks M1 and M2 are displayed on the upper surface of the end edge 26 and the top surface of the protrusion 44, respectively. These marks are triangle marks whose tops are faced to and aligned with each other in positioning the sensor 3 in a normal position with respect to the body 2.

Each of the marks M1 and M2 is not limited to a triangle mark. The mark may be any other mark with any shape that can show the positioning of the sensor 3 in the normal position with respect to the body 2, such as a linear protrusion, a linear cutout portion, a rectangular mark, or the like.

With this arrangement, the attachment of the sensor 3 to the body 2 can be performed while virtually confirming a target position for positioning the sensor 3 to the body 2 with ease without being affected by the size of the clearance between the inner wall surface 44a of the protrusion 44 and the outer wall surface 26a of the end edge 26, which enables the positioning with higher accuracy. Thus, the arrangement of this embodiment can facilitate the attachment work.

Figure 12:
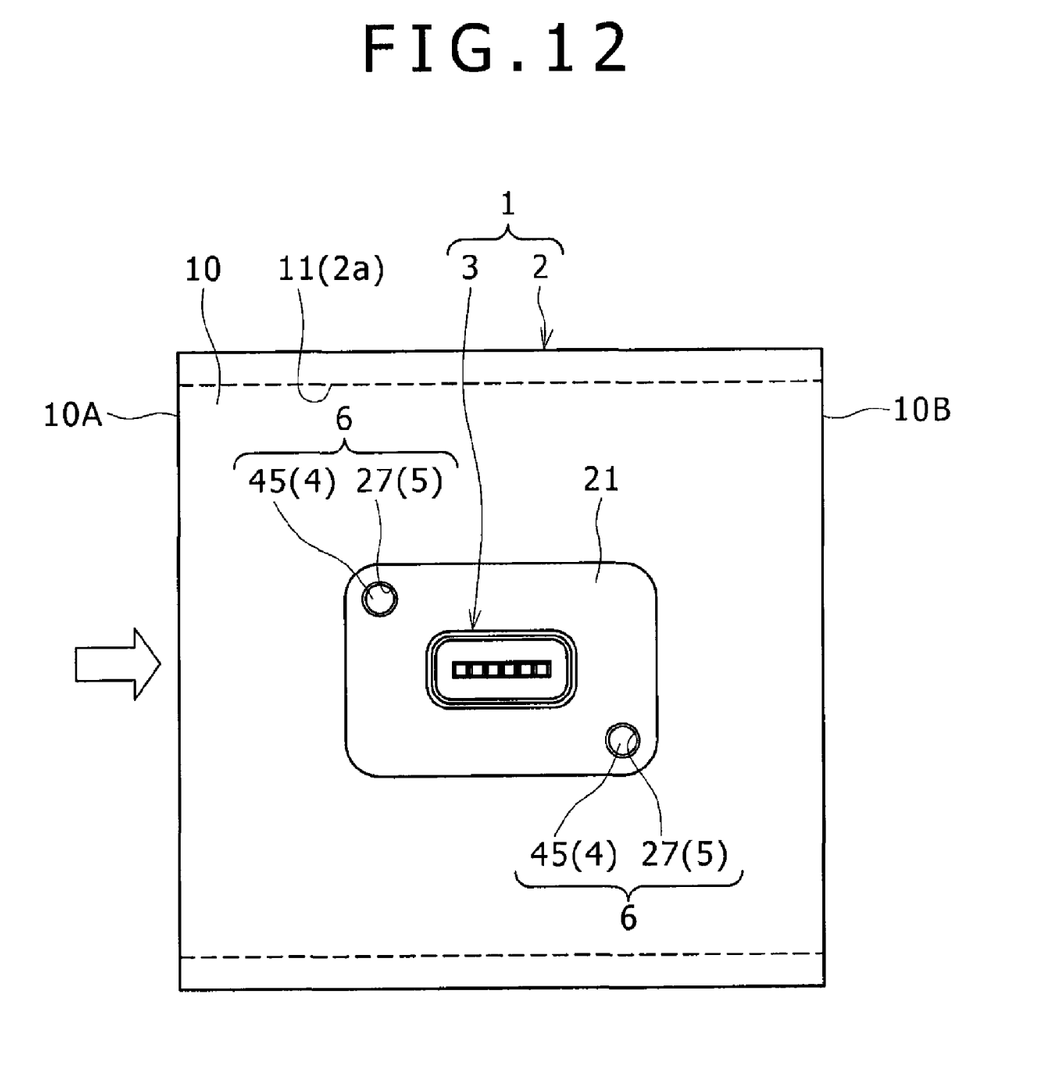
FIG. 12 is a plan view of an air flow measuring device according to a sixth embodiment of the invention.

Now, a sixth embodiment of the invention will be described below using FIG. 12. FIG. 12 is a plan view of an air flow measuring device according to the sixth embodiment.

This embodiment has the feature that fixing of the sensor 3 to the body 2 is performed by methods other than the use of the fixation screw 8, including welding fixing by supersonic waves or vibration, and adhesion fixing using an adhesive.

As shown in FIG. 12, protrusions 45 of the body 2 are provided in pairs spaced apart on the upstream and downstream sides of the body 2 via the insertion hole 12 (see FIG. 3), and protrude to a position higher than the attachment surface 14 (see FIG. 1) of the attachment portion 13. Each protrusion 45 forms the body fitting portion 4 of the positioning part 6, and has a cylindrical shape protruding to have a certain diameter.

On the other hand, the fixed flange 21 of the sensor 3 has a substantially rectangular planar shape, and through holes 27 into which the protrusions 45 are to be inserted are formed at corners on the diagonal line opposed to each other via the housing 20.

Each protrusion 45 of the body 2 is fitted into the corresponding through hole 27 of the sensor 3 in attaching the sensor 3 to the body 2, thereby positioning the sensor 3 in the direction orthogonal to the insertion direction with respect to the body 2, which suppresses variations in attachment position in the plane direction along the attachment surface 14, including the rotation direction of the sensor with respect to the body 2.

The protrusions 45 of the body 2 are exposed from the through holes 27 of the fixed flange 21 in viewing the body 2 in the direction of attaching the sensor 3 to the body 2, so that the sensor 3 can be attached to the body 2 while virtually confirming the fitting state of the protrusions 42 and the cutout portions 36. Thus, this embodiment can obtain the same operation and effect as those of each of the above-mentioned embodiments.

In this embodiment, the protrusion 45 and the through hole 27 have a circular shape, but can have various shapes as applications, such as a triangle shape, a rectangular shape, or an arc shape to have the same operation and effect.

With this arrangement, even when the clearance between the protrusion 45 of the body 2 and the through hole 27 of the sensor 3 is made small or almost nothing, the fitting state can be virtually confirmed with ease in positioning the sensor 3 in the direction orthogonal to the insertion direction with respect to the body 2, which can provide the same operation and effect as those of the first embodiment.

With the arrangement of this embodiment, the through holes 27 can be provided in arbitrary positions of the fixed flange 21. Thus, the positioning part 6 can be arranged in any position designed taking into consideration other parts due to design limitations or assembly limitations of the other parts except for the air flow measuring device 1, for example, an engine layout, which can improve usability and workability.

Figure 13:
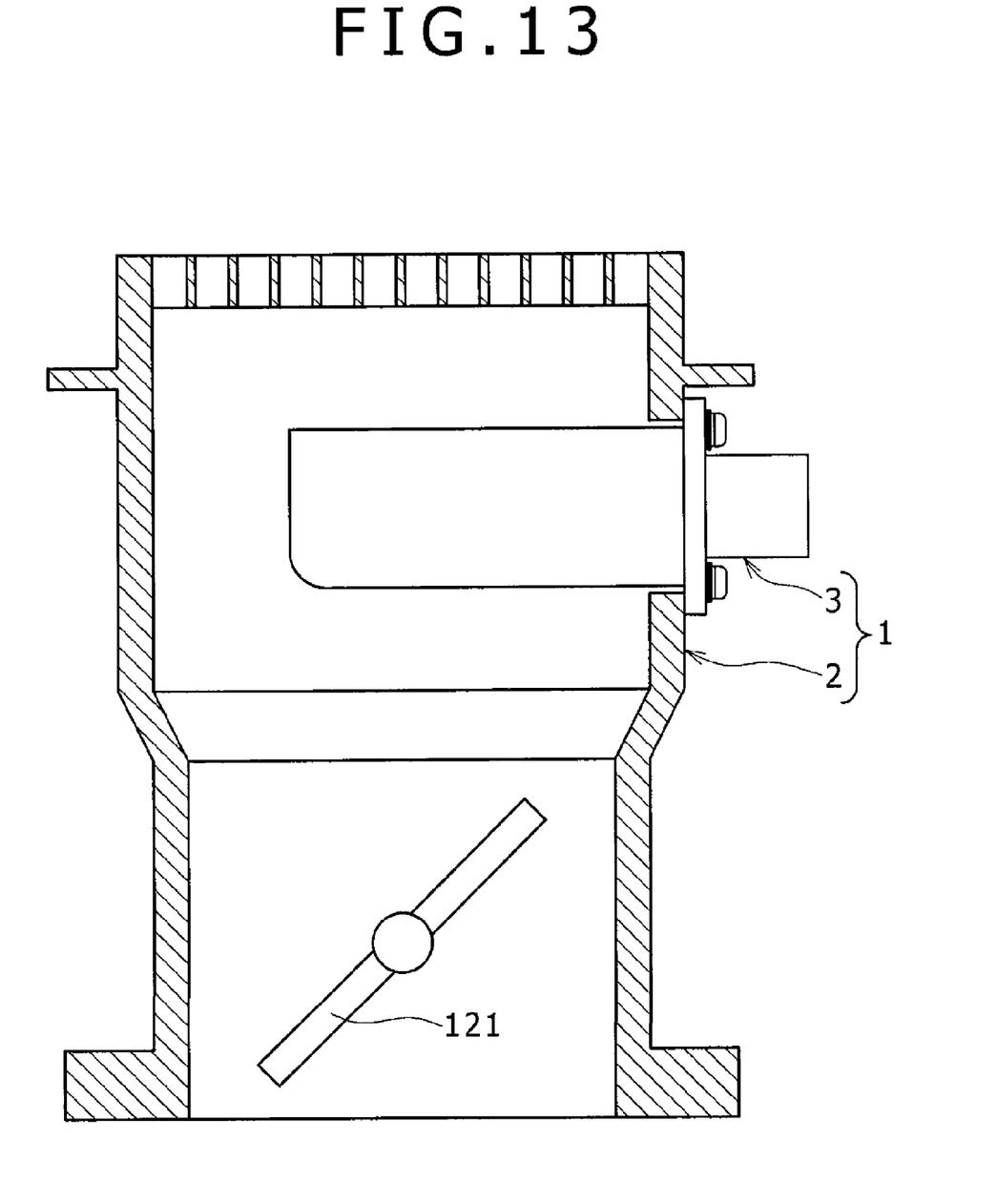
FIG. 13 is a sectional view for explaining another structure of the air flow measuring device.

The structure of the air flow measuring device 1 is not limited to that disclosed in each of the above embodiments, and various modifications can be made without departing from the spirit and scope of the invention. For example, in the description of each embodiment described above, the air flow measuring device 1 includes the body 2 and the sensor 3, and the body 2 is dedicated for the air flow measuring device 1. Alternatively, for example, as shown in FIG. 13, a throttle valve 121 can be integrally provided in the body 2. Even such an arrangement can have the same operation and effect as those of each embodiment described above. Further, a throttle body 103 may be omitted, which can decrease the number of steps in assembly, leading to reduction in cost.

Figure 14:
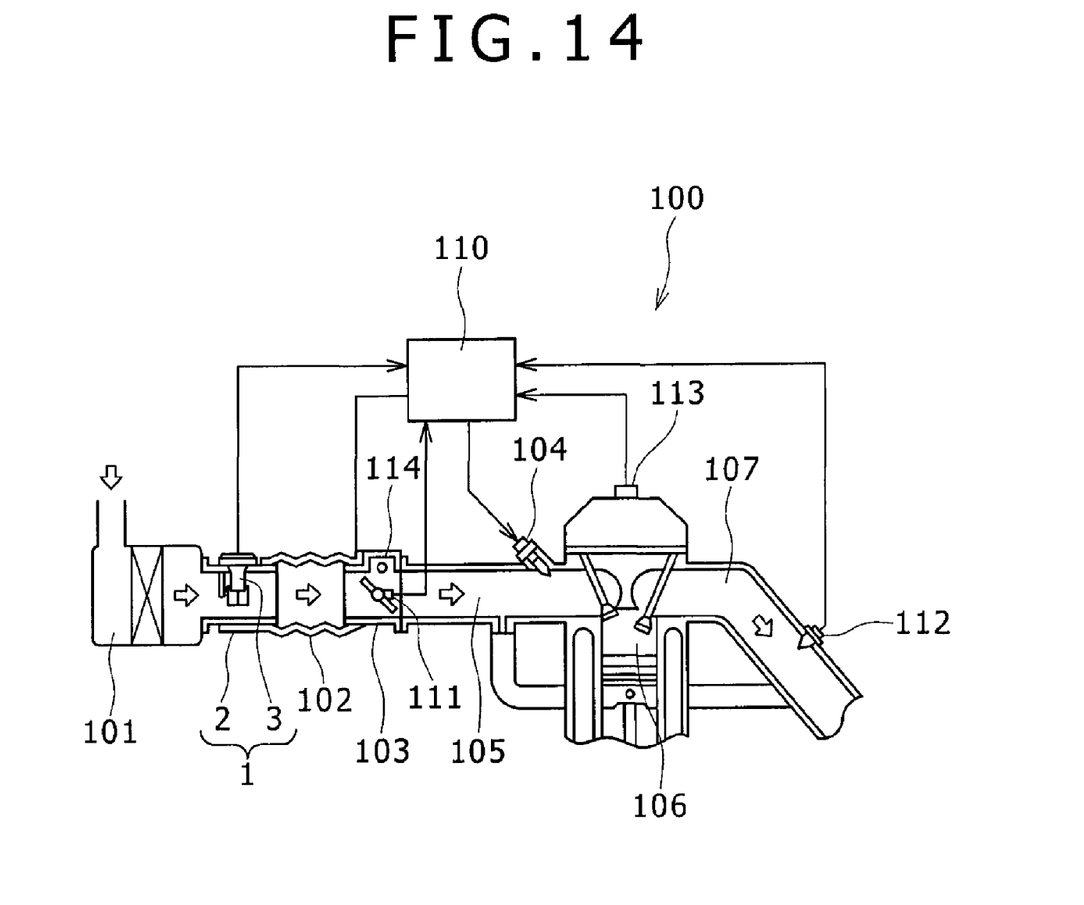
FIG. 14 is a diagram showing a fuel injection control system of an internal combustion engine.

Now, a fuel injection control system 100 of the internal combustion engine using the air flow measuring device 1 will be described below. FIG. 14 is a diagram showing the fuel injection control system 100 of the internal combustion engine in this embodiment. The structure and operation of the fuel injection control system 100 will be as follows.

In the figure, air which has been sucked from the air cleaner is sucked into the engine cylinder 106 via the body 2 of the air flow measuring device 1, an intake pipe 102, and a manifold 105 including a throttle body 103 and an injector 104 to which fuel is supplied. On the other hand, exhaust gas generated by the engine cylinder 106 is emitted via an exhaust manifold 107.

A control unit 110 receives inputs of a flow rate signal output from the sensor 3 of the air flow measuring device 1, an intake air temperature signal from an intake temperature sensor, a throttle valve angle signal output from a throttle angle sensor 111, an oxygen concentration signal output from an oxygen concentration meter 112 provided in the exhaust manifold 107, and an engine rotation speed signal output from an engine tachometer 113. The control unit 110 sequentially performs computation using these signals to determine an optimal amount of fuel injection and an optimal opening degree of an idle air control valve. The control unit 1 controls the injector 104 and an idle control valve 114 using such values.

In this way, the fuel injection control system 100 which is adapted to control the amount of fuel injection with respect to the amount of sucked air of the internal combustion engine by use of the control unit 110 uses the flow rate signal output from the air flow measuring device 1, resulting in no errors of measurement of the air flow rate. Thus, the optimal control of the fuel injection amount, that is, the high-accuracy air/fuel ratio control can be ensured.

Although each embodiment has been specifically described using the accompanying drawings, the invention is not limited to the contents of the above embodiments, and various modifications or the like to the design can be made therein without departing from the scope of the invention.

What is claimed is:

1. An air flow measuring device, comprising:
   a body having a main air passage and an external attachment surface;
   a sensor attached to the body via said attachment surface, for detecting a flow rate of air passing through the main air passage; and
   a positioning part that positions the body and the sensor, wherein the positioning part includes a body fitting portion that is provided on the body in the form of a protrusion that extends substantially normal to the attachment surface, and is positioned outside, and partially encloses, an area of the attachment surface that is covered by the sensor of the assembled air flow measuring device.

2. The air flow measuring device according to claim 1, wherein the body fitting portion opposes a sensor fitting portion that is provided on the sensor, thereby restricting movement of the sensor in a plane of the attachment surface.

3. The air flow measuring device according to claim 2, wherein the body fitting portion is provided in a position outside a projected area of the sensor when the body is viewed in an attachment direction of the sensor.

4. The air flow measuring device according to claim 2, wherein:
   body fitting portions are provided in pairs at positions opposed to each other, on opposite sides of the attachment surface; and
   the sensor is attached to intervene in between the pairs of body fitting portions.

5. The air flow measuring device according to claim 2, wherein the sensor fitting portion is adapted to be fitted into the body fitting portion by attaching the sensor to the body.

6. The air flow measuring device according to claim 5, wherein the sensor fitting portion includes a peripheral edge of the sensor that opposes to the protrusion of the body fitting portion.

7. The air flow measuring device according to claim 6, wherein:
   an attachment hole is formed in the sensor, through which a fixation screw is inserted;
   a screw hole is formed in the body, into which the fixation screw is screwed;
   the protrusion of the body fitting sensor has an arc-shaped inner wall surface whose center is coaxial to a center of the screw hole;
   the peripheral edge of the sensor fitting portion has an arc shaped outer wall surface whose center is coaxial to a center of the attachment hole; and
   the outer wall surface of the peripheral edge is opposed to the inner wall surface by attaching the sensor to the body.

8. The air flow measuring device according to claim 7, wherein:
   the sensor includes a fixed flange that is made of resin and has a metal base plate embedded and held therein;
   the attachment hole is formed in an exposed portion of the base plate that extends from the fixed flange; and
   an end edge of the exposed portion of the base plate forms the sensor fitting portion.

9. The air flow measuring device according to claim 1, wherein the positioning part has a pair of positioning marks aligned with each other for positioning the sensor with respect to the body.

10. An air flow measuring device comprising:
    a body that defines and surrounds a main air passage in an interior space therein, and includes a substantially planar exterior mounting surface;
    a sensor attached to said body, for detecting a flow rate of air passing through the main air passage, said sensor having a mounting flange that includes a base plate that is configured to conform to the exterior mounting surface of the body; and
    a positioning part that positions the sensor relative to the body; wherein,
    said positioning part comprises at least one body fitting portion comprising a contoured flange that protrudes upwardly from a peripheral area of said mounting surface, and at least one sensor fitting portion comprising a peripheral edge portion of said base plate, which has an edge contour that conforms to a contour of said flange; and
    in an assembled state of said air flow measuring device, both of said body fitting portion and said sensor fitting portion are exposed to the exterior of the air flow measuring device, and cooperate to position said sensor relative to said body.

* * * * *